(12) United States Patent
Tracey et al.

(10) Patent No.: US 6,311,724 B1
(45) Date of Patent: Nov. 6, 2001

(54) RESERVOIR FOR POWER STEERING SYSTEM

(75) Inventors: Robert A. Tracey; Thomas W. Hagan, both of Commerce Twp.; Donald P. Rubin, West Bloomfield, all of MI (US)

(73) Assignee: Key Plastics, Inc., Novi, MI (US)

( * ) Notice: Subject to any disclaimer, the term of this patent is extended or adjusted under 35 U.S.C. 154(b) by 0 days.

(21) Appl. No.: 09/243,941

(22) Filed: Feb. 4, 1999

Related U.S. Application Data

(60) Provisional application No. 60/073,708, filed on Feb. 4, 1998.

(51) Int. Cl.[7] ........................................... F17D 1/17
(52) U.S. Cl. ........................... 137/550; 137/576; 60/329; 60/454
(58) Field of Search .................... 137/550, 574, 137/576; 60/329, 453, 454

(56) References Cited

U.S. PATENT DOCUMENTS

| | | | |
|---|---|---|---|
| 2,792,119 | 5/1957 | Leonard | 210/304 |
| 2,800,083 | 7/1957 | Tweedale et al. | 417/79 |
| 2,821,140 | 1/1958 | Pettibone | 417/42 |
| 2,975,801 | * 3/1961 | Kuypers et al. | 137/576 |
| 3,002,355 | * 10/1961 | Brackin | 60/453 X |
| 3,993,094 | * 11/1976 | Spooner | 137/576 X |
| 4,454,717 | * 6/1984 | Wade et al. | 60/453 |
| 4,964,983 | 10/1990 | Abe et al. | 210/168 |
| 5,513,490 | * 5/1996 | Howell et al. | 60/453 X |
| 5,918,760 | * 7/1999 | Frodin et al. | 137/574 X |
| 6,220,283 | * 4/2001 | Saarinen et al. | 137/550 |

\* cited by examiner

*Primary Examiner*—John Rivell
(74) *Attorney, Agent, or Firm*—Rader, Fishman & Grauer PLLC

(57) ABSTRACT

A reservoir is provided having an upper reservoir body connected to a lower reservoir body. The reservoir includes and inlet port and an outlet port that are separated by a filter, which filters fluid flowing from the inlet to the outlet. In addition, a re-circulating cover is provided to separate fluid returning through the inlet port from the fluid in the main reservoir chamber. A re-circulating cover is provided that defines a re-circulating chamber. Fluid communication between the main reservoir chamber and the re-circulating chamber is restricted by the re-circulating cover until the main reservoir fluid reaches a predetermined temperature threshold. Accordingly, a given quantity of fluid is re-circulated from the inlet port to the outlet port and is continuously warmed before mixing with main reservoir fluid. Such a reservoir design helps to eliminate cold start up noises.

20 Claims, 6 Drawing Sheets

RESERVOIR FOR POWER STEERING SYSTEM

This application claims benefit to provisional application No. 60/073,708 Feb. 4, 1998.

FIELD OF THE INVENTION

The present invention relates to reservoirs for power steering systems and more particularly, to reservoirs having fluid flow control features for cold temperature environments.

BACKGROUND OF THE INVENTION

A reservoir is provided in a power steering system to hold a predetermined quantity of hydraulic fluid. Typically, the reservoir has an outlet port that communicates fluid to a power steering pump and an inlet port that returns fluid from a power steering gear back into the reservoir. It is also known to provide a filter inside the reservoir to filter the fluid as it flows from the inlet port to the outlet port.

However, one draw back of such known reservoirs is that hydraulic fluid does not flow fast enough through the filter during cold temperature operation. The colder the hydraulic fluid, the greater the resistance to flow. Such increased viscosity greatly reduces the ability of the fluid to pass through the filter. As a result, an insufficient amount of fluid is supplied to the pump. The insufficient amount of fluid causes cavitation within the pump, which produces undesirable noise and sound.

One known reservoir design has attempted to diminish cold weather effects. The known reservoir utilizes a relatively complex series of angled guide members and a series of filter elements to control the directional flow of fluid returning from the inlet port to the outlet port. However, the elaborate guide system is costly to manufacture and has an unnecessarily large number of parts.

SUMMARY OF THE INVENTION

The present invention is directed to a reservoir for a power steering system having an upper reservoir body connected to a lower reservoir body and has a removable cap for accessing the interior of the reservoir. A filter is disposed within the reservoir at a location to filter fluid entering from an inlet port and exiting through an outlet port. In addition, a re-circulating cover is provided having first and second passages that limit communication between fluid in a main reservoir chamber and fluid in a re-circulating chamber.

In operation, relatively warm fluid from the inlet port flows into the re-circulating chamber and passes through the filter before traveling through the outlet port to a pump. During cold weather operation, the same fluid from the inlet port is continuously re-circulated through the re-circulating chamber to the outlet port, resulting in warming of the fluid as it passes through the power steering system. The re-circulating cover includes venturi slots having predetermined configurations that limit the flow of relatively cold hydraulic fluid in the main reservoir chamber into the re-circulating chamber. Further, at least one orifice is provided in the re-circulating cover that allows flow of warm fluid in the re-circulating chamber into the relatively colder fluid contained in the main reservoir chamber.

According to another embodiment of the present invention, a re-circulating cover is provided having spiral or vortex shaped channels for efficiently delivering re-circulating fluid from the inlet port to the filter, and ultimately to the outlet port and pump.

Therefore, according to the present invention, a sufficient amount of fluid is supplied to the steering pump, even during initial cold weather operation, to greatly reduce, minimize or eliminate unwanted noise.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
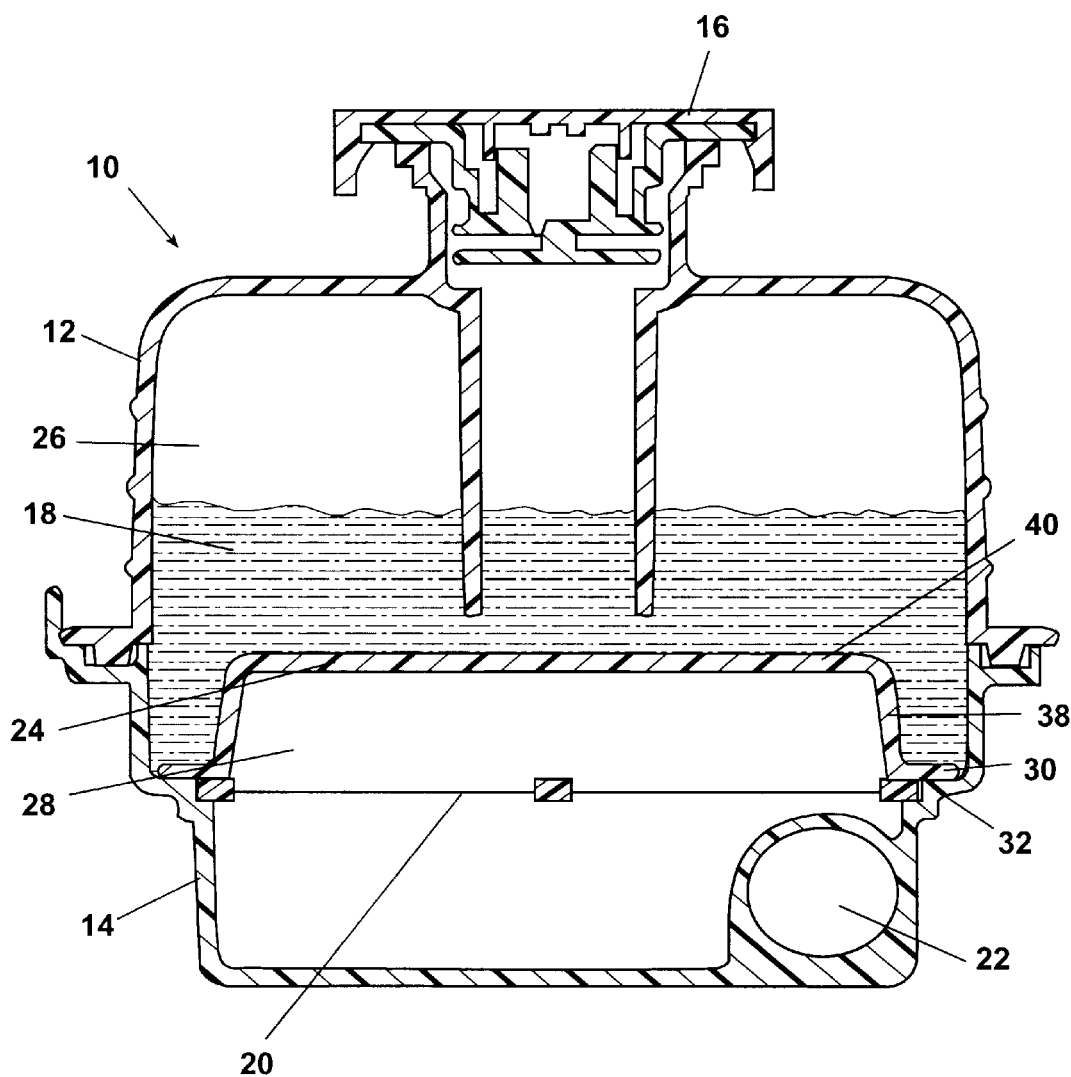
FIG. 1 is a cross-sectional view of the reservoir according to the present invention.

FIG. 1 shows a reservoir 10 for use in a hydraulic system, such as a power steering system (not shown). Reservoir 10 includes an upper reservoir body 12 connected to a lower reservoir body 14. A cap 16 is releaseably connected to upper reservoir body 12 to allow introduction of hydraulic fluid 18 into reservoir 10. A filter 20 is attached to a lower reservoir body 14, upstream from an outlet port 22 that communicates fluid to a pump (not shown). A re-circulating cover 24 separates fluid in a main reservoir chamber 26 from fluid in a re-circulating chamber 28. Re-circulating cover 24 is illustrated having a generally hat shaped cross-section, however, any suitable shape can be utilized. Re-circulating cover 24 includes an outer flange 30 that engages both an outer periphery of filter 20 and a shoulder 32 of reservoir 10. Re-circulating chamber 28 receives fluid from an inlet port 34, which is shown in FIG. 2.

Figure 2:
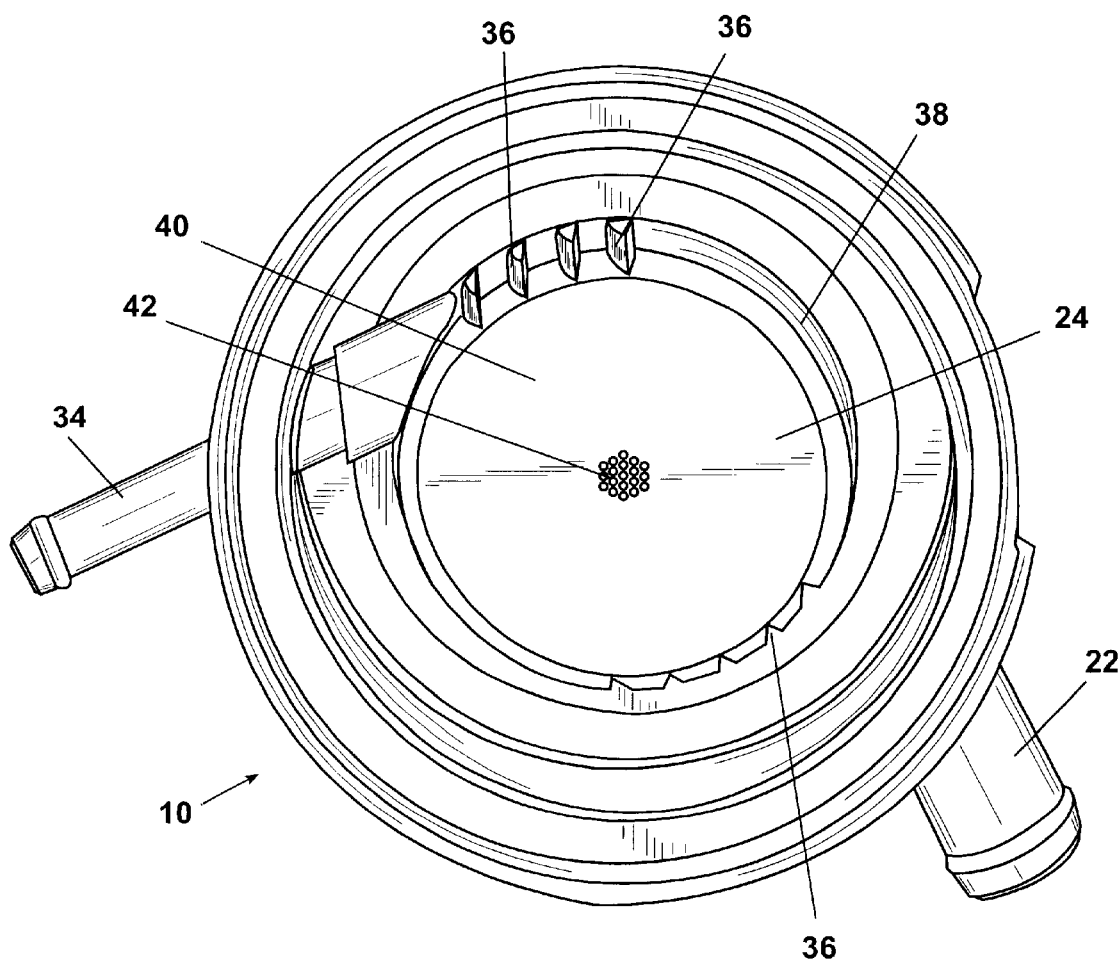
FIG. 2 is a top isometric view of the lower reservoir body.

As shown in FIG. 2, re-circulating cover 24 includes a plurality of circumferentially spaced apart venturi slots 36 located on generally cylindrical outer side wall 38. Venturi slots 36 have predetermined configurations including predetermined size and shape to control fluid flow from main reservoir chamber 26 to re-circulating chamber 28. A top 40 of cover 24 is connected to side wall 38 and is predominately solid except for a plurality of orifices 42 that are sized and configured to restrict fluid flow from re-circulating chamber 28 to main reservoir chamber 26 below a predetermined temperature level. Therefore, re-circulating cover 24 creates a physical barrier between main reservoir chamber 26 and re-circulating chamber 28, except for very limited fluid communication paths.

Figure 3:
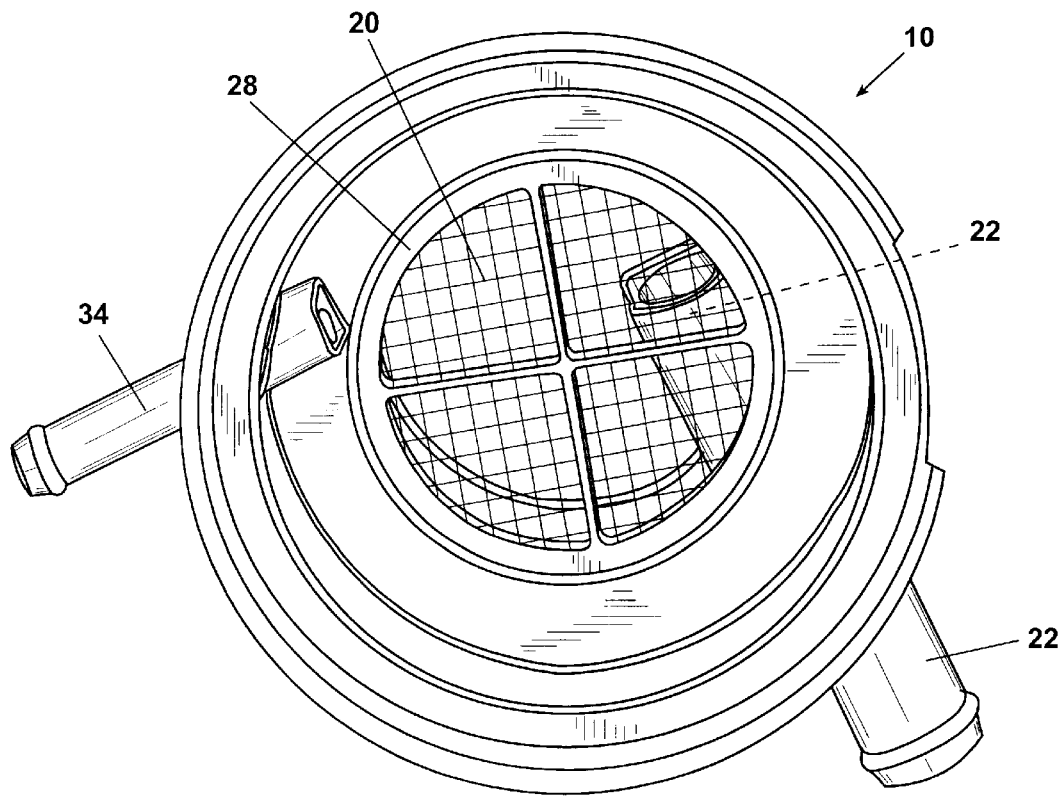
FIG. 3 is a top isometric view of the lower reservoir body, without a re-circulating cover.

As shown in FIG. 3, inlet port 34 delivers fluid into re-circulating chamber 28 at a position vertically above filter 20. Outlet port 22 receives filtered fluid from re-circulating chamber 28 for communicating to a pump (not shown).

Next, the operation of the reservoir 10 in a cold weather environment will be described. During initial cold weather operation of, for example, a steering system utilizing the present invention, fluid is removed from reservoir 10 via outlet port 22 and returned to reservoir 10 through inlet port 34. Incoming fluid from inlet port 34 flows into re-circulating chamber 28 and is separated from fluid in main reservoir chamber 26 by re-circulating cover 24. The re-circulating fluid then passes through filter 20 and is re-circulated to outlet port 22 to re-supply the pump. As the re-circulating fluid continues to pass through the steering system, it tends to warm up by virtue of frictional heat produced within the system. When the re-circulating fluid reaches a predetermined threshold temperature or viscosity, some of the warm fluid in re-circulating chamber 28 is allowed to flow through orifices 42 in top 40 of re-circulating cover 24. Consequently, some of the warm re-circulating fluid mixes with the relatively colder fluid in main reservoir chamber 26. Orifices 42 have a size and profile that prevents the relatively colder main reservoir fluid 26 from flowing into re-circulating cover 24 until fluid in main reservoir chamber 26 reaches a predetermined threshold temperature or viscosity.

The only way in which cold fluid in main reservoir chamber 26 is allowed to enter re-circulating cover 24 is through venturi slots 36 located on the side wall 38 of re-circulating cover 24. Again, because of higher viscosity of the cold main reservoir fluid 26, flow through venturi slots 36 is restricted only to fluid having at least a second predetermined temperature or viscosity.

As re-circulating fluid continues to increase in temperature and mix with fluid in main reservoir chamber 26 via flow through orifices 42, fluid in main reservoir chamber 26 also warms. In addition, heat is conducted from the warmer re-circulating cover 24 to the colder fluid in main reservoir chamber 26 that immediately surrounds cover 24. When fluid in reservoir chamber 26 reaches the predetermined threshold temperature, a desired viscosity level is obtained. The viscosity level corresponds to the threshold temperature/viscosity level of orifices 42 and allows free, bi-directional flow of fluid through orifices 42. Such a free flow of fluid helps to maintain a relatively constant flow of fluid to the pump and therefore minimizes cavitation. Thus, unwanted cold start noise is greatly minimized or eliminated.

Figure 4:
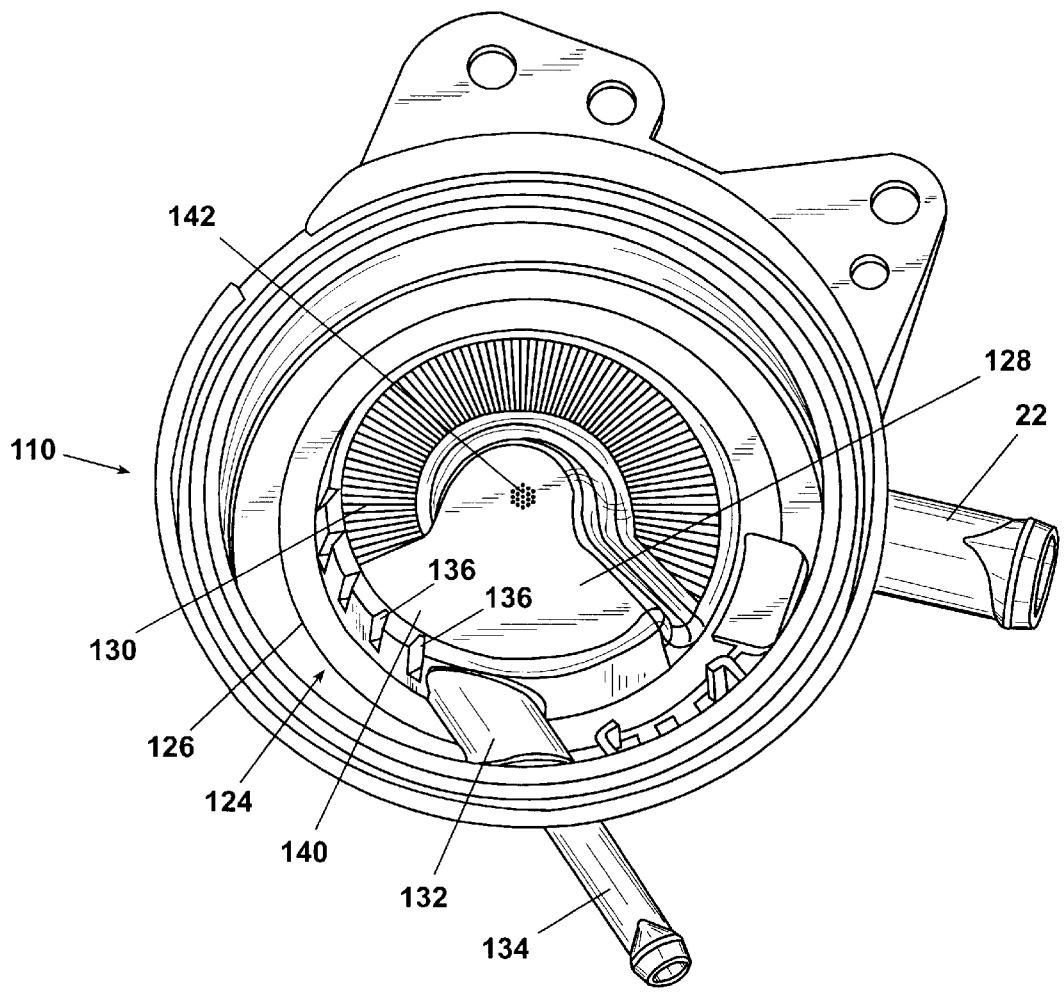
FIG. 4 is a top isometric view of a the lower reservoir body, according to a second embodiment of the present invention.
Figure 5:
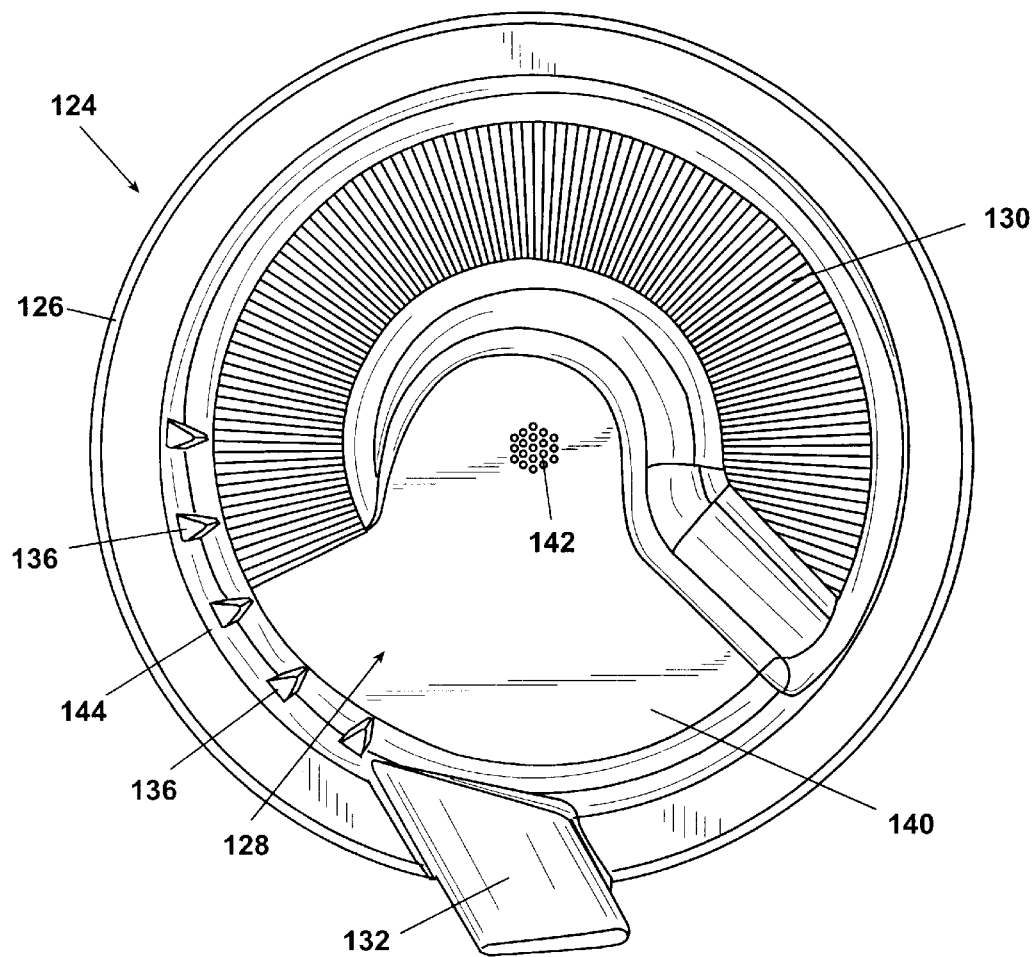
FIG. 5 is a top isometric view of a re-circulating cover, according to the second embodiment.
Figure 6:
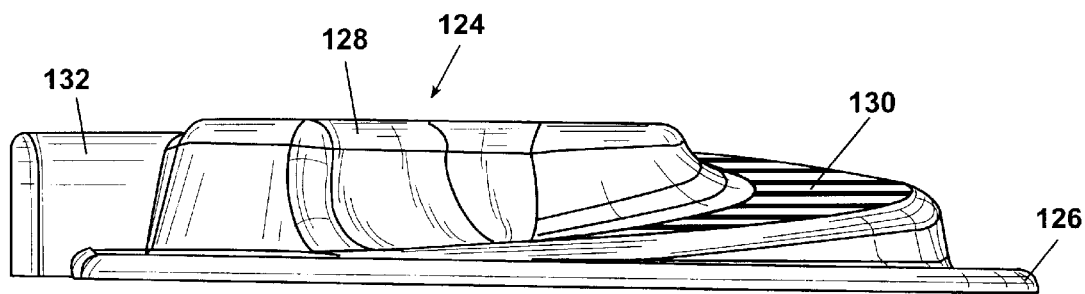
FIG. 6 is a side isometric view of the re-circulating cover of FIG. 5.

Another embodiment of the present invention is shown in FIGS. 4–6. FIGS. 4–6 show a reservoir 110 having most of the same features as reservoir 10 described above. However, the re-circulating cover 124 has a different design. The re-circulating cover 124 has an outer periphery 126 connected to a raised central portion 128 by a spiral or vortex shaped portion 130. The outer periphery 126 includes an arcuate inlet tunnel 132 for communication with an inlet port 134. The raised central portion 128 includes a plurality of orifices 142, similar to orifices 42, described above, and has a generally constant height.

The vortex shaped portion 130 changes in height and/or shape in a clockwise direction in FIG. 5. The vortex shaped portion 130 has a greatest height adjacent the inlet tunnel 132 and decreases consistently in height in a clockwise, circumferential direction. As shown in FIG. 5, the vortex shaped portion 130 extends approximately 270 degrees around the raised central portion 128. However, the vortex portion 130 can extend any suitable arcuate amount. For purposes of description, the raised central portion 128 includes the additional approximately 90 degree portion 140 having generally the same height as the portion containing the orifices 142.

Similar to re-circulating cover 24, the re-circulating cover 124 of the second embodiment includes venturi slots 136 spaced circumferentially about a side wall 144 of the re-circulating cover 124. The venturi slots 136, like the orifices 142, perform identical functions as in the first embodiment.

As shown in FIG. 6, the leftmost side of the re-circulating cover 124 shows the inlet tunnel 132 connected to the raised central portion 128. The rightmost side of FIG. 6 shows a reduced height vortex portion 130 that also tapers downwardly in a radially outward direction. The purpose of the vortex design is for efficiently delivering re-circulating fluid from the inlet port 134 to the filter, and ultimately to the outlet port 122 and pump.

Preferred embodiments of the present invention have been disclosed. A person of ordinary skill in the art would realize, however, that certain modifications would come within the teachings of this invention. For example, the venturi slots may be replaced by other venturi-type elements that provide the same restriction of flow between colder fluid and warmer fluid. Likewise, the orifices may take any form or profile that produces a restrictive flow between warmer fluid and colder fluid. Further, the location of the venturis and orifices can be changed.

What is claimed is:

1. A reservoir for holding fluid comprising:
   an upper reservoir body connected to a lower reservoir body;
   an inlet port;
   an outlet port;
   a main chamber defined by at least one of the upper and lower reservoir bodies;
   a re-circulating cover provided in the reservoir such that the main chamber is at least partially separated from a re-circulating chamber and wherein the re-circulating cover separates fluid returning through the inlet port from fluid in the main reservoir chamber such that fluid communication between the main chamber and the re-circulating chamber is restricted by the re-circulating cover until the main reservoir fluid reaches a predetermined temperature threshold.

2. The reservoir of claim 1, further comprising a filter located in the reservoir between the inlet port and the outlet port for filtering fluid flowing from the inlet port to the outlet port.

3. The reservoir of claim 1, wherein the re-circulating cover includes venturi slots for limiting fluid communication.

4. The reservoir of claim 1, wherein the re-circulating cover includes a spiral shape.

5. The reservoir of claim 1, wherein the recirculating cover has first and second passages that limit fluid communication between the main chamber and the recirculating chamber.

6. The reservoir of claim 5, wherein the first passage is defined by at least one venturi slot having a predetermined configuration to limit flow of relatively cold fluid from the main reservoir to the recirculating chamber.

7. The reservoir of claim 5, wherein the second passage is defined by at least one orifice that allows relatively warm fluid to flow from the recirculating chamber to the main chamber.

8. The reservoir of claim 1, wherein the recirculating cover has a generally hat-shaped cross-section.

9. The reservoir of claim 2, wherein the recirculating cover includes an outer flange that engages both an outer periphery of the filter and a shoulder of the reservoir.

10. The reservoir of claim 1, wherein the recirculating cover includes a top connected to at least one side wall and wherein the top includes an orifice and the at least one side wall includes venturi slots.

11. The reservoir of claim 1, wherein the recirculating cover includes at least one orifice that prevents flow of relatively colder fluid in the main reservoir from flowing into the recirculating chamber until fluid in the main chamber reaches a first predetermined threshold temperature.

12. The reservoir of claim 11, wherein the recirculating cover further includes venturi slots that permit flow only of fluid having at least a second predetermined threshold temperature.

13. The reservoir of claim 1, wherein the recirculating cover has an outer periphery connected to a raised central portion by a spiral shaped portion.

14. The reservoir of claim 13, wherein the outer periphery includes an arcuate inlet tunnel for communication with the inlet bore and the raised central portion includes a plurality of orifices.

15. The reservoir of claim 13, wherein the spiral-shaped portion changes in at least one of height or shape in a circumferential direction.

16. The reservoir of claim 15, wherein the spiral-shaped portion has a greatest height adjacent the inlet tunnel.

17. The reservoir of claim 15, wherein the spiral-shaped portion extends approximately 270° around the raised central portion.

18. The reservoir of claim 15, wherein the recirculating cover includes venturi slots spaced circumferentially about a side wall.

19. A reservoir for a power steering system comprising:

an upper body connected to a lower reservoir body;

an inlet port;

an outlet port;

a main chamber defined by at least one of the upper and lower reservoir bodies;

a re-circulating cover provided in the reservoir such that the main chamber is at least partially separated from a re-circulating chamber and wherein the re-circulating cover separates fluid returning through the inlet port from fluid in the main reservoir chamber such that fluid communication between the main chamber and the re-circulating chamber is restricted by the re-circulating cover until the main reservoir fluid reaches a predetermined temperature threshold;

the recirculating cover includes a top connected to at least one side wall, wherein the top includes an orifice and the at least one side wall includes venturi slots; and the orifice prevents flow of relatively colder fluid in the main reservoir from flowing into the recirculating chamber until fluid in the main chamber reaches a first predetermined threshold temperature.

20. The reservoir of claim 19, wherein the venturi slots permit flow of fluid having at least a second predetermined threshold temperature.

* * * * *